United States Patent
Chun et al.

(10) Patent No.: US 12,057,552 B2
(45) Date of Patent: Aug. 6, 2024

(54) METHOD FOR MANUFACTURING LITHIUM SECONDARY BATTERY AND LITHIUM SECONDARY BATTERY MANUFACTURED THEREBY

(71) Applicant: LG CHEM, LTD., Seoul (KR)

(72) Inventors: In Tae Chun, Daejeon (KR); Jae Huoung Son, Daejeon (KR); Chang Min Han, Daejeon (KR); Ik Soo Chae, Daejeon (KR); Chang Bum Ahn, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 750 days.

(21) Appl. No.: 16/633,428

(22) PCT Filed: Jan. 29, 2019

(86) PCT No.: PCT/KR2019/001198
§ 371 (c)(1),
(2) Date: Jan. 23, 2020

(87) PCT Pub. No.: WO2019/182242
PCT Pub. Date: Sep. 26, 2019

(65) Prior Publication Data
US 2020/0227788 A1 Jul. 16, 2020

(30) Foreign Application Priority Data
Mar. 21, 2018 (KR) .......................... 10-2018-0032489

(51) Int. Cl.
*H01M 10/0585* (2010.01)
*H01M 10/0525* (2010.01)
*H01M 10/44* (2006.01)

(52) U.S. Cl.
CPC ... *H01M 10/0585* (2013.01); *H01M 10/0525* (2013.01); *H01M 10/446* (2013.01)

(58) Field of Classification Search
CPC ......... H01M 10/0525; H01M 10/0585; H01M 10/446
See application file for complete search history.

(56) References Cited

U.S. PATENT DOCUMENTS

2011/0294007 A1* 12/2011 Hosaka ............... H01M 50/426
29/623.2
2013/0199030 A1 8/2013 Song et al.
(Continued)

FOREIGN PATENT DOCUMENTS

CN 1713443 A 12/2005
CN 102593520 * 7/2012
(Continued)

OTHER PUBLICATIONS

Song (KR 2015-0022264), machine translation (Year: 2015).*
(Continued)

*Primary Examiner* — Brittany L Raymond
(74) *Attorney, Agent, or Firm* — Birch, Stewart, Kolasch & Birch, LLP (57) ABSTRACT

A method for manufacturing a secondary battery capable of preventing the phenomenon of bending of an electrode stack generated in an activation step, and a secondary battery produced thereby are provided. The method of manufacturing a lithium secondary battery includes (a) a step of manufacturing a lithium secondary battery by embedding an electrode stack together with an electrolyte in a battery case, (b) a step of aging the battery at room temperature, (c) a hot press step of applying pressure and heat to the lithium secondary battery, and (d) a step of charging the battery, in which a stack surface of the electrode stack is laminated by the hot press step. In the process of activating the secondary
(Continued)

battery in which the electrolyte is injected by performing a hot press step, it is possible laminate the stack surface of the electrode stack before the charging process.

13 Claims, 6 Drawing Sheets

(56) References Cited

U.S. PATENT DOCUMENTS

| | | | |
|---|---|---|---|
| 2014/0013584 A1 | 1/2014 | Wang et al. | |
| 2015/0243964 A1 | 8/2015 | Yu et al. | |
| 2015/0280208 A1 | 10/2015 | Kimura et al. | |
| 2017/0012320 A1* | 1/2017 | Ogihara | H01M 4/386 |
| 2017/0077501 A1* | 3/2017 | Nishiura | H01M 4/386 |
| 2017/0237110 A1 | 8/2017 | Chen et al. | |
| 2017/0294671 A1* | 10/2017 | Jin | H01M 12/08 |
| 2017/0338459 A1* | 11/2017 | Nakahiro | H01M 50/426 |
| 2018/0076442 A1* | 3/2018 | Choi | B32B 37/0053 |
| 2018/0248219 A1 | 8/2018 | Kim et al. | |
| 2018/0366709 A1* | 12/2018 | Mizuno | H01M 50/411 |
| 2019/0140239 A1* | 5/2019 | Mizuno | H01M 50/406 |

FOREIGN PATENT DOCUMENTS

| | | |
|---|---|---|
| CN | 104054208 A | 9/2014 |
| CN | 104247130 A | 12/2014 |
| CN | 104269584 A | 1/2015 |
| CN | 104425839 A | 3/2015 |
| CN | 104425848 A | 3/2015 |
| CN | 104769754 A | 7/2015 |
| CN | 106129505 A | 11/2016 |
| CN | 108299514 A | 1/2017 |
| CN | 102593520 A | 6/2024 |
| EP | 2 894 698 A1 | 7/2015 |
| JP | 2002-110252 A | 4/2002 |
| JP | 2003-151616 A | 5/2003 |
| JP | 2007-157560 A | 6/2007 |
| JP | 2015-185509 A | 10/2015 |
| KR | 10-2013-0091174 A | 8/2013 |
| KR | 10-2014-0117789 A | 10/2014 |
| KR | 10-2014-0132618 A | 11/2014 |
| KR | 10-2015-0022264 A | 3/2015 |
| KR | 10-2017-0124341 A | 11/2017 |

OTHER PUBLICATIONS

English translation of CN Publication 102593520, Jul. 2012.*
Extended European Search Report for European Application No. 19771173.2, dated Nov. 20, 2020.
Korean Office Action for Korean Application No. 10-2018-0032489, dated Nov. 27, 2020, with English translation.
International Search Report (PCT/ISA/210) issued in PCT/KR2019/001198, mailed on May 3, 2019.
Yang et al., "Safety of Lithium Ion Batteries—Principle, Design and Test", University of Electronic Science and Technology of China Press, May 2012, pp. 12-13 with a partial English translation.

* cited by examiner

METHOD FOR MANUFACTURING LITHIUM SECONDARY BATTERY AND LITHIUM SECONDARY BATTERY MANUFACTURED THEREBY

TECHNICAL FIELD

This application claims the benefit of priority based on Korean Patent Application No. 10-2018-0032489, filed on Mar. 21, 2018, and the entire contents of the Korean patent application are incorporated herein by reference.

The present invention relates to a method for manufacturing a lithium secondary battery and a lithium secondary battery manufactured thereby, and more particularly, to a method of manufacturing a lithium secondary battery for preventing an electrode stack from bending due to an activation process of a stacked or lamination-stack type secondary battery, and a lithium secondary battery manufactured thereby.

BACKGROUND ART

Due to the development of technology and increasing demand for mobile devices, the demand for secondary batteries is also rapidly increasing. Among them, lithium secondary batteries with high energy density, high operating voltage, and excellent storage and life characteristics are used as energy sources for various mobile devices as well as various electronic products.

In general, a lithium secondary battery is formed in a structure that seals an electrode assembly and an electrolyte in a battery case, and is classified into a cylindrical battery, a square-type battery, and a pouch-type battery according to its appearance. Further, it may be classified into a lithium ion battery, a lithium ion polymer battery, a lithium polymer battery and the like, depending on the form of the electrolyte. Due to the recent trend toward the miniaturization of mobile devices, the demand for thinner square-type batteries and pouch-type batteries is increasing, and in particular, there is a high interest in pouch-type batteries that are easily deformed and have a small weight.

Meanwhile, the electrode assembly accommodated in the battery case may be classified into a jelly-roll type (winding type), a stack type (lamination type), a stack and folding type (composite type), and a lamination and stack type structure according to its shape.

In general, in order to prepare a jelly-roll type electrode assembly, a metal foil used as a current collector is coated with an electrode active material, pressed, then cut into bands having a desired width and length, and then a negative electrode and a positive electrode are separated by a separation film and then spirally wound. Further, the stacked electrode assembly refers to an electrode assembly manufactured by vertically stacking a negative electrode, a separator, and a positive electrode. The stack and folding electrode assembly refers to an electrode assembly manufactured by rolling or folding electrode stacks consisting of a single electrode or a negative electrode/separator/positive electrode into one long sheet-type separation film having a long length. The lamination and stack type electrode assembly refers to an electrode assembly manufactured by laminating one or more positive electrodes and one or more separators to form electrode cells, and then stacking the electrode cells (hereinafter, referred to as "lamination and stack scheme").

In general, secondary batteries are manufactured through an activation process after the electrode assembly is assembled into a battery case together with an electrolyte solution. The activation process stabilizes the battery structure and makes it usable through charging, aging, and discharging the assembled battery.

However, in the case of the stacked electrode assembly, a bending phenomenon occurs in which the electrode assembly is bent in an elongated shape during the activation process, and this bending phenomenon is more prominent in the lamination and stacked electrode assembly.

Korean Laid-Open Patent No. 2015-0015303 discloses a technology of pressurizing a battery at the time of charging during an activation process, but this is to allow gas generated during the activation process to be discharged to the outside of the battery, and there is a limit as the technology for preventing the bending phenomenon of the lamination and stack type electrode assembly. Therefore, there is an urgent need to develop a technology capable of preventing such a bending phenomenon during the activation process of the stacked rechargeable battery or the lamination and stacked secondary battery.

DISCLOSURE

Technical Problem

An object of the present invention is to provide a method for manufacturing a secondary battery capable of preventing the phenomenon of bending of an electrode stack generated in an activation step, and a secondary battery produced thereby.

Technical Solution

A method of manufacturing a lithium secondary battery according to an embodiment of the present disclosure includes (a) a step of manufacturing a lithium secondary battery by embedding an electrode stack together with an electrolyte in a battery case, (b) a step of aging the lithium secondary battery at room temperature, (c) a hot press step of applying pressure and heat to the lithium second battery, and (d) a step of charging the battery, in which a stack surface of the electrode stack is laminated by the hot press step.

According to an appropriate embodiment of the present invention, the hot press step may include applying pressure at a pressure of 3 kgf/cm2 to 10 kgf/cm2 at 60° ° C. to 90° ° C. for 3 to IS minutes.

According to an appropriate embodiment of the present invention, the hot press step may include applying pressure at a pressure of 3 kgf/cm2 to 7 kgf/cm2 at 65° C. to 75° ° C. for 3 to 7 minutes.

According to an appropriate embodiment of the present invention, the electrode stack may have one structure selected from the group consisting of a stack type, a stack-folding type, and a lamination-stack type.

According to a suitable embodiment of the present invention, the electrode stack may have a lamination-stack type structure.

According to a suitable embodiment of the present invention, the step of aging the lithium secondary battery may be carried out at 20° ° C. to 30° ° C. for 12 to 80 hours.

According to a suitable embodiment of the present invention, the electrode stack may include a plurality of basic unit electrode assemblies and the stack surface may be an interface between adjacent basic unit electrode assemblies.

The present invention also provides a lithium secondary battery prepared by the above manufacturing method.

The lithium secondary battery manufactured according to the embodiment of the present invention is characterized in that the thickness deviation is 3 μm or less.

The lithium secondary battery prepared according to an embodiment of the present invention is characterized in that the adhesive force deviation of the stack surface of the electrode stack is 5 gf/25 mm or less.

The present invention provides a battery pack including at least one lithium secondary battery and a device using the battery pack as a power source.

Advantageous Effects

In the process of activating the secondary battery in which the electrolyte is injected, before the initial charging, by performing a hot press process of applying a constant pressure and heat to the secondary battery, it is possible to give an effect of laminating the stack surface of the electrode stack before the charging process, and therefore there is an effect of improving the nonuniformity of the stack surface of the electrode stack due to the expansion of the electrode and the generation of gas during charging.

In addition, by improving the nonuniformity of the stack surface of the electrode stack, there is an effect that can prevent the phenomenon that the electrode stack is bent.

DETAILED DESCRIPTION OF THE PREFERRED EMBODIMENTS

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

Hereinafter, a method of manufacturing a secondary battery according to an embodiment of the present invention will be described with reference to the drawings.

Figure 1:
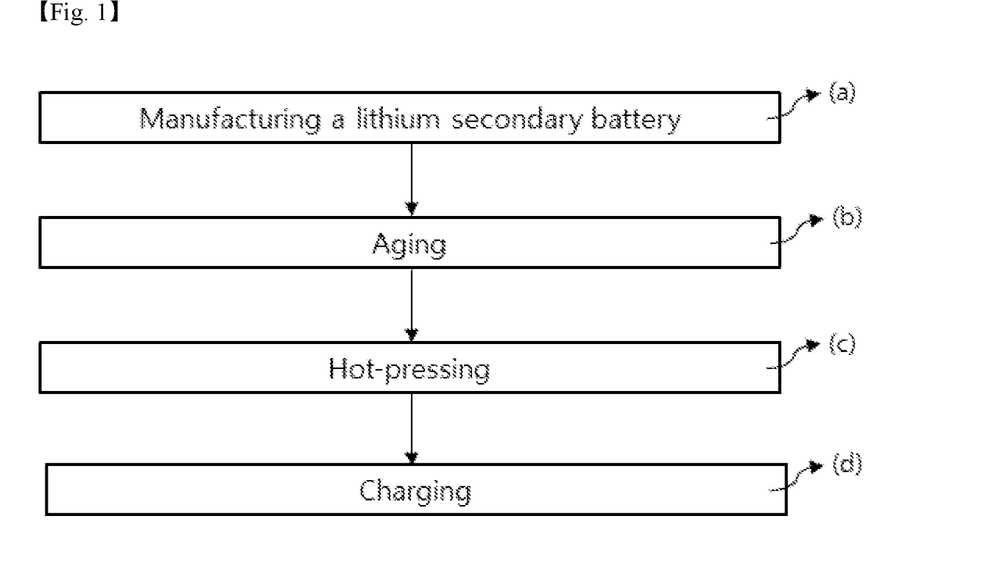
FIG. 1 is a flowchart schematically illustrating a method of manufacturing a secondary battery according to an embodiment of the present invention.

FIG. 1 is a flowchart schematically illustrating a method of manufacturing a secondary battery according to an embodiment of the present invention. As illustrated in FIG. 1, a method of manufacturing a lithium secondary battery includes:

(a) a step of manufacturing a lithium secondary battery by embedding an electrode stack together with an electrolyte in a battery case;
(b) a step of aging the battery at room temperature;
(c) a hot press step of applying pressure and heat to the battery; and
(d) a step of charging the battery.

In general, a lithium secondary battery undergoes an activation process, in which an electrode expands and a gas is generated by a chemical reaction by charging. This causes uneven adhesion between the electrode interfaces and ultimately causes a secondary battery to be bent, resulting in a defective battery. In particular, when the lithium secondary battery has a stack type or a lamination-stack type structure, the unevenness of the stack surface becomes more prominent, and the bending phenomenon tends to be intensified.

A secondary battery having a lamination-stack structure refers to a structure in which a plurality of unit electrode assemblies including one or more negative electrodes and one or more separators are stacked. The unit electrode assembly may have a structure of a negative electrode/separator/positive electrode/separator. The interface between the separator of the unit electrode assembly constituting the electrode stack and the electrode of another unit electrode assembly is called a stack surface. In the stack surface of the electrode stack, since the separator of the unit electrode assembly and the electrode of another unit electrode assembly are simply stacked, the interface imbalance becomes more prominent by the charge during the activation process.

Accordingly, the feature of the present invention is in preventing a bending phenomenon that may occur during charging by hot pressing the battery prior to charging and laminating the stack surface.

The step (a) of manufacturing the lithium secondary battery is to embed the electrode stack in the battery case, and then inject the electrolyte into the battery case to seal.

The electrode stack may be one structure selected from the group consisting of a stack type, a stack-fold type, and a lamination-stack type, and in particular, the lamination-stack type structure may best express the object of the present invention. The electrode stack of the lamination-stack structure may include one or more electrodes having a separator laminated on one or both surfaces thereof. For example, the electrode assembly of the lamination-stack structure may have a structure in which the separator is bonded to one surface of the positive electrode or the negative electrode. In addition, the separator may be bonded to both sides of the positive electrode or both sides of the negative electrode. In addition, the positive electrode, the separator and the negative electrode may be bonded to each other in a state where the separator is interposed between the positive electrode and the negative electrode.

Figure 2:
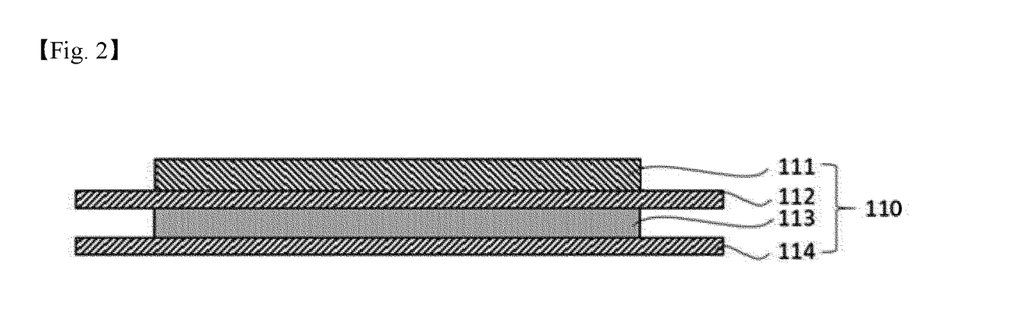
FIG. 2 is a cross-sectional view schematically showing an electrode stack according to an embodiment of the present invention.

In the present invention, as shown in FIG. 2, a structure formed by stacking two electrodes 111 and 113 and two separators 112 and 114 as a unit electrode assembly 110 of an electrode stack will be described as an example.

Figure 3:
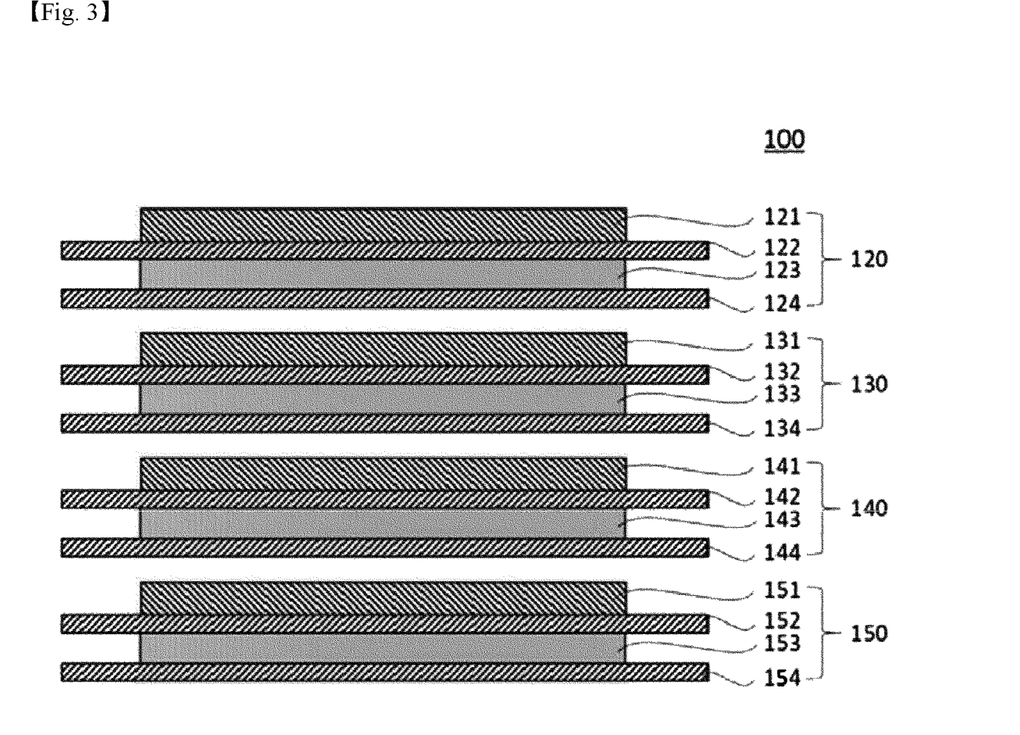
FIGS. 3 to 5 are cross-sectional views illustrating a hot press step according to an embodiment of the present invention.

In addition, as shown in FIG. 3, the electrode stack 100 may have a structure in which the basic unit electrode assemblies 120, 130, 140, and 150 are repeatedly stacked. FIG. 3 illustrates a four-layer structure in which four basic unit electrode assemblies 120, 130, 140, and 150 are stacked, but is not limited thereto.

Meanwhile, the positive electrode is prepared by applying a mixture of a positive electrode active material, a conductive material and a binder on a positive electrode current collector, followed by drying. If necessary, a filler may be further added to the mixture.

The positive electrode active material may be a layered compound such as lithium cobalt oxide ($LiCoO_2$), lithium nickel oxide ($LiNiO_2$), or a compound substituted with one or more transition metals; lithium manganese oxides such as $Li_{1+x}Mn_{2-x}O_4$ (herein, x is between 0 and 0.33), $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; Ni-site type lithium nickel oxide expressed by $LiNi_{1-x}M_xO_2$ (herein, M=Co, Mn, Al, Cu, Fe, Mg, B or Ga, and x=0.01 to 0.3); a lithium manganese compound oxide expressed by $LiMn_{2-x}M_xO_2$ (where M=Co, Ni, Fe, Cr, Zn or Ta, x=0.01 to 0.1) or $Li_2Mn_3MO_8$ (where M=Fe, Co, Ni, Cu or Zn); $LiMn_2O_4$ in which a part of Li is substituted with an alkaline earth metal ion; disulfide compounds; $Fe_2(MoO_4)_3$, etc., but not limited thereto.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like, but the present invention is not limited to these examples.

The binder is added in an amount of 1 to 30% by weight, on the basis of the total weight of the mixture containing the positive electrode active material, as a component that assists in bonding between the active material and the conductive material and bonding to the current collector. Non-limiting examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluorine rubber, various copolymers and the like.

The filler is optionally used as a component for inhibiting expansion of a positive electrode, and is not particularly limited as long as it is a fibrous material without causing a chemical change in the battery. Examples of the filler include olefin polymers such as polyethylene and polypropylene; fibrous materials such as glass fibers and carbon fibers.

The negative electrode may be formed by coating a negative electrode active material on a negative electrode collector and drying the negative electrode active material. Optionally, the negative electrode may further include the above-described components.

Examples of the negative electrode active material include carbon such as non-graphitized carbon and graphite carbon; metal complex oxide such as $Li_xFe_2O_3(0 \leq x \leq 1)$, $Li_xWO_2(0 \leq x \leq 1)$, $Sn_xMe_{1-x}Me'_yO_z$ (Me: Mn, Fe, Pb, Ge; Me': Al, B, P, Si, groups 1, 2, and 3 of the periodic table, halogen; $0 \leq x \leq 1$; $1 \leq y \leq 3$; $1 \leq z \leq 8$); lithium alloy; silicon alloy; tin alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The separator may be formed of an insulating thin film having high ion permeability and mechanical strength. The process diameter of the separator is generally between 0.01 and 10 μm, the thickness may be between 5 and 300 μm. Examples of such a separator include olefin-based polymers such as polypropylene which is chemically resistant and hydrophobic; a sheet or a nonwoven fabric made of glass fiber, polyethylene or the like. When a solid electrolyte such as a polymer is used as the electrolyte, the solid electrolyte may also serve as a separator.

Non-limiting examples of the electrolyte may be a non-aqueous electrolyte, an organic solid electrolyte, an inorganic solid electrolyte, or the like.

The non-aqueous electrolyte may be a lithium salt-containing non-aqueous electrolyte, and non-limiting examples of the non-aqueous liquid electrolyte may include aportic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, dioxolane derivatives, sulfolane, methyl sulfolane, 1,3-dimethyl-2-imidazolidinone, propylene carbonate derivatives, tetrahydrofuran derivatives, ethers, methyl propionate and ethyl propionate.

Examples of the organic solid electrolyte include a polymer electrolyte such as a polyethylene derivative, a polyethylene oxide derivative, a polypropylene oxide derivative, a phosphate ester polymer, an agitation lysine, a polyester sulfide, a polyvinyl alcohol, a polyvinylidene fluoride, a polymer including an ionic dissociation group, and the like.

Examples of the inorganic solid electrolyte include nitrides, halides, and sulfates of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a substance that is soluble in the non-aqueous electrolyte. The examples of the lithium salt include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium 4-phenylborate, lithium imide and the like.

For the purpose of improving charge/discharge characteristics, flame retardancy, etc., pyridine, triethylphosphite, triethanolamine, cyclic ether, ethylenediamine, n-glyme, hexaphosphoric triamide, nitrobenzene derivative, sulfur, quinone imine dye, N-substituted oxazolidinone, N-substituted imidazolidine, ethylene glycol dialkyl ether, ammonium salt, pyrrole, 2-methoxyethanol, aluminum trichloride, etc. may be added to the non-aqueous electrolyte. In some cases, a halogen-containing solvent such as carbon tetrachloride or ethylene trifluoride may be further added to impart nonflammability, or a carbon dioxide gas may be further added to improve high temperature storage characteristics.

The aging step (b) is a step of aging at a predetermined temperature so that the electrolyte solution is impregnated to the electrode assembly. Aging step (b) may be carried out for 12 to 80 hours at room temperature, which is a temperature range of 20 to 30° C. The aging step (b) is a process for maintaining the impregnation of the electrolyte to the electrode assembly in the secondary battery. If the aging step (b)

is performed for less than 12 hours, the electrode assembly cannot be sufficiently impregnated with the electrolyte. If it is performed for more than 80 hours, the aging step (b) is performed for too much time compared to the time required for the impregnation of the electrolyte, and therefore there is a problem that the overall time required for the manufacture of the secondary battery can be increased.

The hot press step (c) may be a step of applying a predetermined pressure and heat to the secondary battery. In the present invention, the hot press starts when the aging step (b) is completed, that is, when the electrode assembly is wetted by the electrolyte. As described above, in the step (c) of activating the secondary battery during manufacture thereof, some of the electrolyte is decomposed due to the chemical reaction, the electrode expands, and a large amount of gas is generated, resulting in uneven adhesion between the electrodes. As a result, a bending phenomenon occurs in which the electrode assembly (particularly, a lamination-stack type structure) is bent in an elongated shape.

On the other hand, the method of manufacturing a secondary battery according to the present invention includes the step of applying a predetermined pressure and heat to the electrode assembly before the charge/discharge process for activation of the secondary battery, which can give the lamination effect of the internal electrode interface to thereby improve the nonuniformity of the interface, thereby preventing the bending of the electrode assembly that may occur in the activation process.

This hot press step (c) may be carried out at a pressure range of 3 to 10 kgf/cm2 for 3 to 15 minutes at 60 to 90° C.

The temperature range is preferably 65 to 80° C., more preferably 70 to 75° C. When the temperature of the hot press is less than 60° C., it is difficult to achieve the object of the present invention, and when it exceeds 90° C., it is not preferable because it adversely affects the electrode characteristics.

The pressure range may preferably be 3 to 7 kgf/cm2, and more preferably 4 to 6 kgf/cm2. The time range is preferably 3 to 7 minutes, more preferably 4 to 6 minutes.

On the other hand, if it is higher than the pressure and time range, it may damage the outer surface of the battery case and the electrode assembly, and when it is lower than the pressure and time range, it is not possible to obtain the lamination effect of the desired inner stack surface.

In addition, the pressure may be a pressure applied by using a separate pressurizing means from the outside of the electrode assembly. The pressurizing means is not particularly limited as long as it is a means capable of pressing the outer surface of the electrode assembly or the battery case. For example, the pressurizing means is composed of a pair of hot plates or pressure rollers, and it is preferable to have a structure for pressing the outer surface of the electrode assembly or the battery case by passing the secondary battery between the hot plates or pressure rollers.

Specifically, the hot plates have a hexahedral structure and have a structure in which the length of the long axis of the hot plate is at least equal to the length of the length of the long axis of the electrode assembly, in which after the secondary battery is disposed between the hot plates, a constant pressure may be applied to the entire outer surface of the electrode assembly or the battery case.

The pressure rollers are cylindrical and have a structure in which the length of the long axis of the pressure roller is at least equal to the length of the length of the short axis of the electrode assembly, in which by passing the secondary battery between the pressure rollers, a constant pressure may be applied to the entire outer surface of the electrode assembly or the battery case.

In such a structure, hot plates or pressurizing rollers are preferably located on the same plane perpendicular to the direction in which the secondary battery passes.

Figure 4:
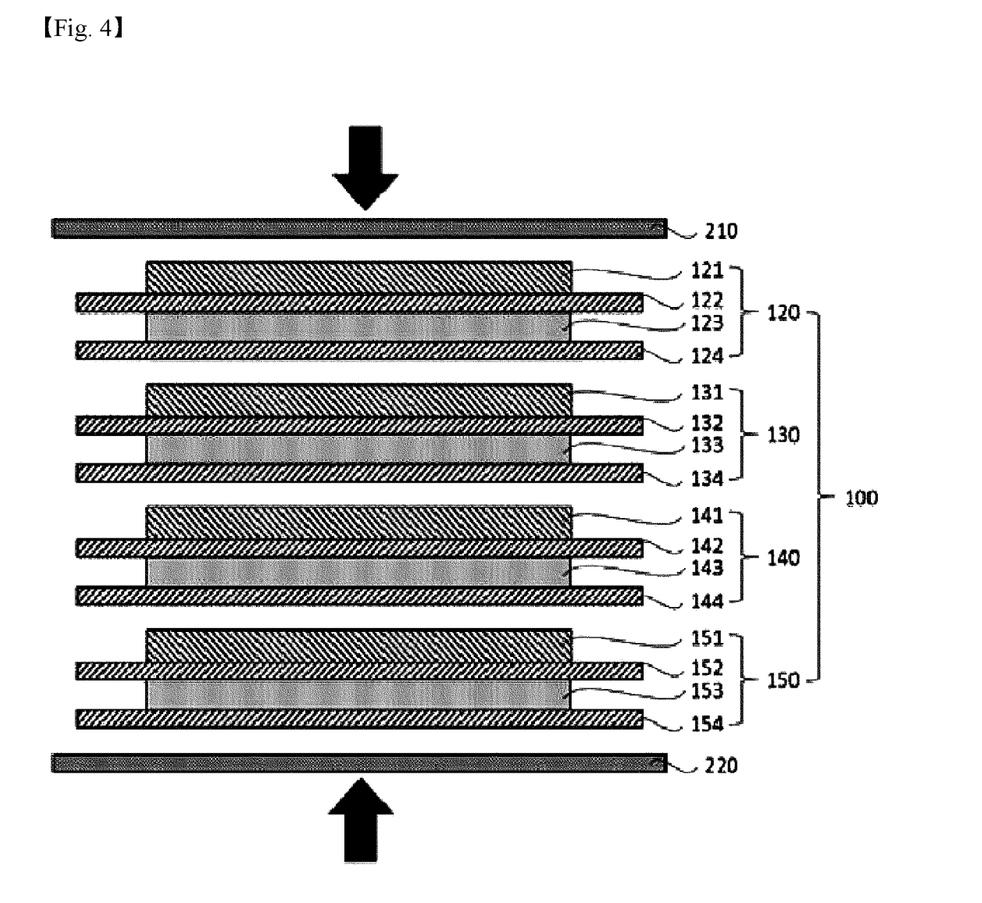
Figure 5:
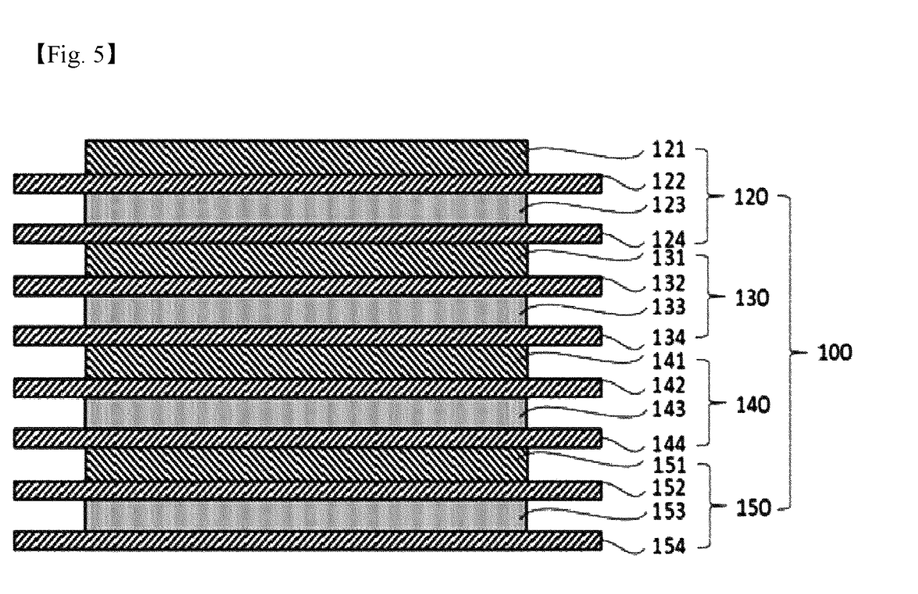

Referring to FIGS. 4 and 5, by applying a constant pressure to the entire outer surface of the electrode stack 100 through the pressurizing means (210, 220) disposed at the top and bottom of the secondary battery, respectively, the lamination effect of the interface (stack surface) between the stacked basic unit electrode assemblies 120, 130, 140, and 150 may be given, thereby improving the nonuniformity of the interface.

The charging step (d) may be a step for activating by applying a voltage to the secondary battery, and may include a charge/discharge process. This is also referred to as a primary formation process. Initial charging in the primary charging step (d) may be performed up to a voltage range of 3.5 to 4.0V. In general, the secondary battery is activated by performing initial charging in the manufacturing process. During this initial charging, lithium ions from the positive electrode are moved to the negative electrode and inserted into the negative electrode, and at this time, a solid electrolyte interface (SEI) film is formed on the surface of the negative electrode.

Once formed, the SEI film acts as an ion tunnel to pass only lithium ions. Lithium ions may be solvated as the effect of the ion tunnel, and organic solvent molecules having a large molecular weight, such as lithium salt, EC, DMC, or DEC, which move together with lithium ions in the electrolyte, are inserted together into the graphite negative electrode, thereby preventing disruption of the structure of the negative electrode. Once the SEI film is formed, lithium ions do not side-react with the graphite negative electrode or other material any more, and the amount of charge consumed to form the SEI film has a property of not reversibly reacting upon discharging at an irreversible capacity. Therefore, no further decomposition of the electrolyte occurs, and the amount of lithium ions in the electrolyte is reversibly maintained to maintain stable charge/discharge.

In conclusion, once the SEI film is formed, the amount of lithium ions is reversibly maintained and the battery life characteristics are also improved.

The SEI membrane is relatively firm under normal conditions that maintain the stability of the electrolyte, that is, a temperature range of −20 to 60° C. and a voltage of 4 V or less, and may sufficiently play a role of preventing side reactions between the negative electrode and the electrolyte.

However, there is a problem that the durability of the SEI film gradually decreases during high temperature storage in a fully charged state (for example, left at 85° C. for 4 days after 100% charge at 4.2V).

That is, when stored at a high temperature in a full charge state, the SEI film gradually decays as time passes, and the negative electrode is exposed, and the surface of the exposed negative electrode reacts with the surrounding electrolyte to continuously produce side reactions and generate gases such as CO, $CO_2$, $CH_4$, $C_3H_6$ etc. to thereby cause an increase in the battery internal pressure.

Therefore, if this initial charging is performed below 3.5V, the secondary battery cannot be activated sufficiently, so that the SEI film cannot be formed sufficiently. On the contrary, if the initial charging is performed above 4.0V, the durability of the SEI film may be rather deteriorated in the subsequent aging process.

In the primary charge/discharge process (d), the charge/discharge rate (C-rate) may be 0.01 to 20 C-rate, preferably 0.05 to 10 C-rate, and more preferably 0.1 to 3 C-rate.

After performing the primary charging or primary formation process, it may additionally include secondary aging, secondary formation and gas removal processes. Secondary aging may be performed at room temperature or high temperature, and the time may be 20 to 40 hours, but is not limited thereto. The aging time, temperature, and pressure may be appropriately selected according to requirements such as battery capacity and performance.

In the secondary charge/discharge process, the charge/discharge rate (C-rate) may be 0.01 to 20 C-rate, preferably 0.05 to 10 C-rate, and more preferably 0.1 to 3 C-rate.

The secondary charge/discharge process may be performed by discharging to reach a set output voltage after performing a full discharge and a full charge of the secondary battery.

More specifically, after the initial charging, the secondary battery is naturally discharged through an aging process, and in this process, the voltages of the secondary batteries may become different from each other, and each of the secondary batteries may be regulated and classified to have different voltages, depending on the device to which each is applied.

Accordingly, the secondary batteries are discharged to reach the set output voltage in the fully discharged and fully charged states, thereby not only maintaining the same voltage state but also discharging and classifying the respective secondary batteries in a desired voltage range, thereby separately preparing final secondary batteries of different types.

The output voltage may be set in the range of 80% to 90% with respect to the fully charged voltage of the secondary battery.

If the output voltage is set to less than 80% of the fully charged voltage of the secondary battery, it may not be used immediately due to a natural discharge in the standby process until the final secondary battery is used. However, on the contrary, if the output voltage is set to above 90%, it will wait at an excessively high voltage state until the final secondary battery is used, which may cause problems such as leakage of the electrolyte, or if the final secondary battery is arbitrarily recharged by the user prior to use, the final secondary battery may not be sufficiently reactivated by recharging, which may degrade performance.

The degassing process in the secondary battery may be a step of removing gas generated in the activation process.

This degassing process is generally performed by applying pressure in a vacuum state, and in one specific example, the process may be performed through a clamp & bake process performed in a high temperature, closed state.

The lithium secondary battery of the present invention manufactured by the above method gives a lamination effect on the stack surface of the electrode stack, and prevents bending to thereby have a uniform thickness and adhesiveness on the stack surface.

The thickness deviation of the secondary battery produced by the Example of this invention is 3 micrometers or less, and the adhesive force deviation of the stack surface of the electrode stack is 5 gf/25 mm or less.

On the other hand, since the present invention can provide a battery pack including at least one secondary battery manufactured by the manufacturing method as described above and can provide a device including the battery pack as a power source, the device may be one selected from the group consisting of a mobile phone, a portable computer, a wearable electronics, a tablet PC, a smart pad, a netbook, a light electronic vehicle (LEV), an electric vehicle, a hybrid electric vehicle, a plug-in hybrid electric vehicle and a power storage device.

Hereinafter, the present invention will be described in detail with reference to Examples, but the following Examples are merely to illustrate the present invention, and the present invention is not limited by the following Examples.

Example 1

95% by weight of artificial graphite, 1.5% by weight of conductive material (Super-P) and 3.5% by weight of binder (PVdF) as negative electrode active materials were mixed with NMP which is a solvent, to thereby prepare a negative electrode mixture. Further, the negative electrode mixture was coated on a copper foil having a thickness of 20 μm to have a thickness of 200 μm, and then rolled and dried to prepare a negative electrode.

The negative electrode, polyethylene separator, and lithium foil positive electrode were sequentially stacked on the polyethylene separator, and then laminated to prepare a unit electrode assembly. Four unit electrode assemblies were prepared, and an electrode stack was manufactured by stacking the positive electrode of each unit electrode assembly and the separator of another unit electrode assembly to be in contact with each other. The electrode stack was fabricated in a pouch of a laminate sheet with an electrolyte solution of 1 M $LiPF_6$ dissolved in a carbonate solvent of EC:EMC=1:2 to prepare a half cell. The half cell is aged at room temperature for 48 hours, and when the wetting of the electrolyte is completed, hot pressing is performed at 70° C. and a pressure of 5 kgf/cm2 for 5 minutes using a hot plate, to thereby prepare a secondary battery in which each basic unit interface (stack surface) has been laminated. Thereafter, the secondary battery was charged to 3.6 V to perform an activation process.

Example 2

A half secondary battery was manufactured under the same conditions as in Example 1, except that the temperature of the hot plate was changed to 75° C. in the hot press performing step of Example 1.

Example 3

A half secondary battery was manufactured under the same conditions as in Example 1, except that the pressure of the hot plate was changed to 7 kgf/cm2 in the hot press performing step of Example 1.

Comparative Example 1

A half secondary battery was manufactured in the same manner as in Example 1, except that the hot press step was not performed in Example 1.

Comparative Example 2

A half secondary battery was manufactured under the same conditions as in Example 1, except that the temperature of the hot plate was changed to 50° C. in the hot press performing step of Example 1.

Experimental Example 1 Observation of Bending Phenomena of a Battery

The batteries of Examples 1 to 3 and Comparative Examples 1 and 2 were disassembled and visually confirmed whether the electrode stack was bent, and the results are shown in Table 1 below. The situation that the electrode stack was bent was indicated by "O" and the situation that the electrode stack was flat without being bent was indicated by "X".

TABLE 1

|  | Example 1 | Example 2 | Example 3 | Comparative Example 1 | Comparative Example 2 |
|---|---|---|---|---|---|
| Whether bent | X | X | X | O | O |

As described above, in the case of the battery according to the manufacturing method of the present invention, no bending phenomenon was observed, but the battery of Comparative Example 1 without lamination of the stack surface was bent the most, and in the case of the battery of Comparative Example 2 in which the temperature of the hot plate was relatively low, some bending phenomenon could be observed.

Experimental Example 2 Thickness Deviation Measurement

Figure 6:
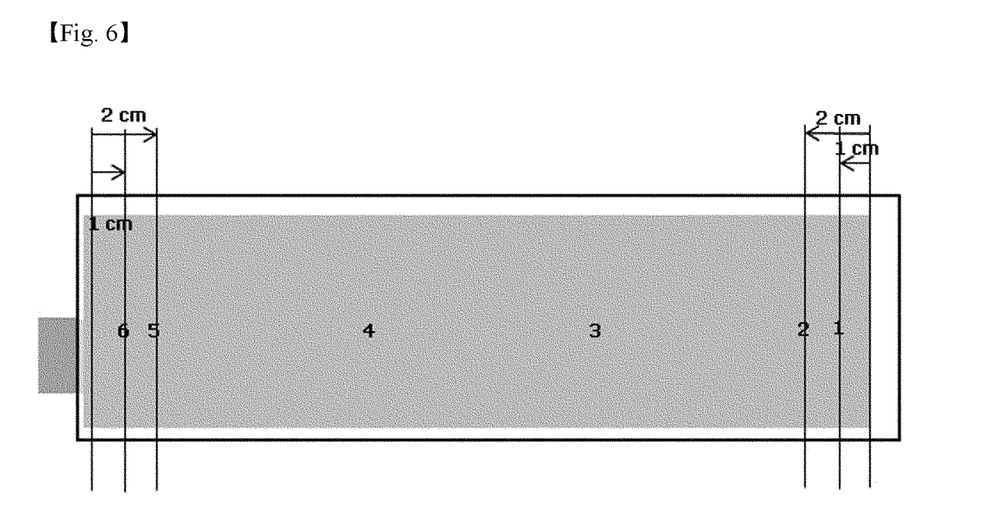
FIG. 6 is a view showing a thickness measurement point of a battery in order to measure the thickness variation of the battery according to the Examples and Comparative Examples of the present invention.
Figure 7:
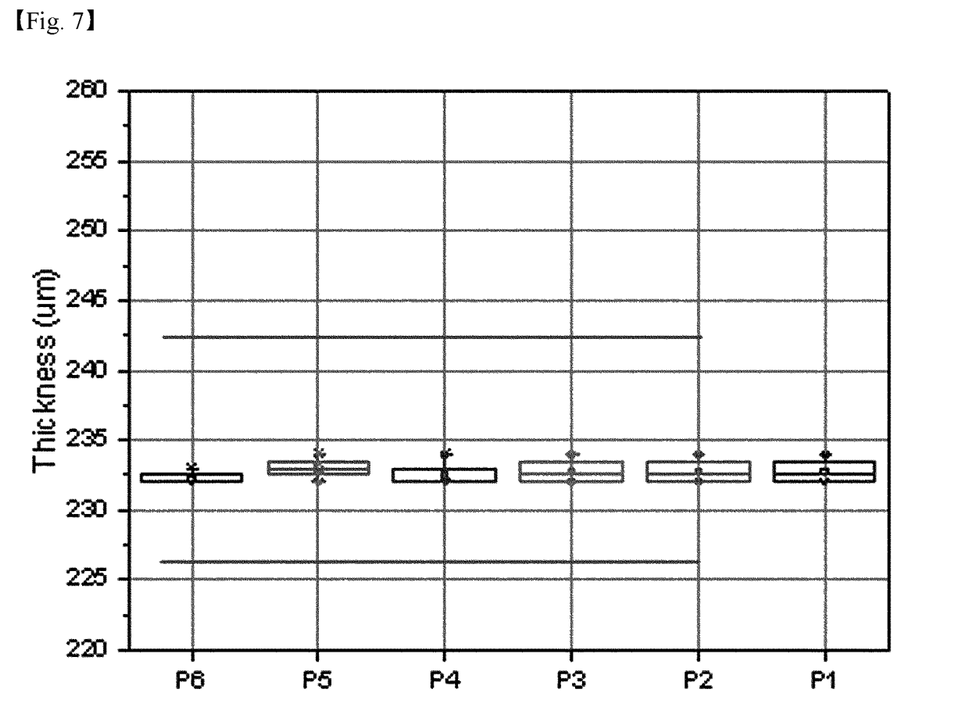
FIG. 7 is a graph showing the results of measuring the thickness of the battery according to an embodiment of the present invention.

For the battery of Example 1, six points were determined as shown in FIG. 6, the thickness of the battery was measured at each point, and the results are shown in FIG. 7. As shown in FIG. 7, it can be seen that the battery of Example 1 has excellent thickness uniformity, with variations in thickness at each of six points being 3 μm or less.

Figure 8:
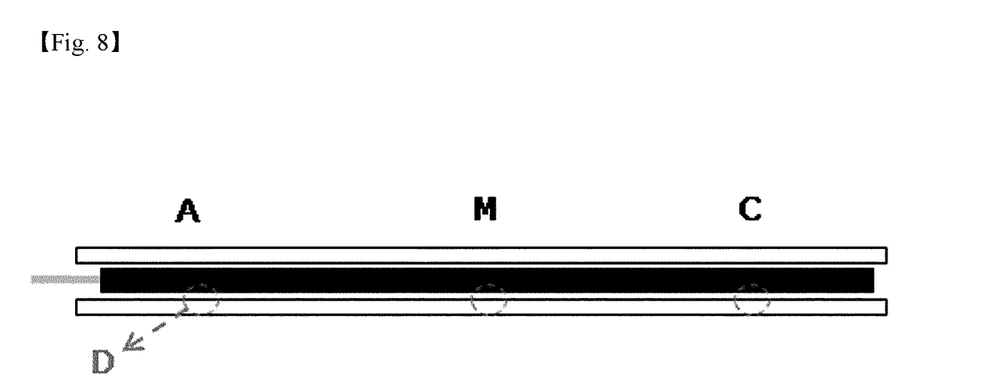
FIG. 8 is a view showing the adhesive force measurement point of a battery in order to measure the adhesive force of a stack surface for the battery according to an embodiment of the present invention.

Experimental Example 3 Measurement of Interfacial Adhesion Deviation of Battery The electrode stack of the battery of Example 1 was cut into parts having a width of 25 mm, and 180° peel strength was measured at a peel rate of 100 mm/min with respect to the interface between the negative electrode and the separator at three points as shown in FIG. 8. And the result is shown in FIG. 9.

Figure 9:
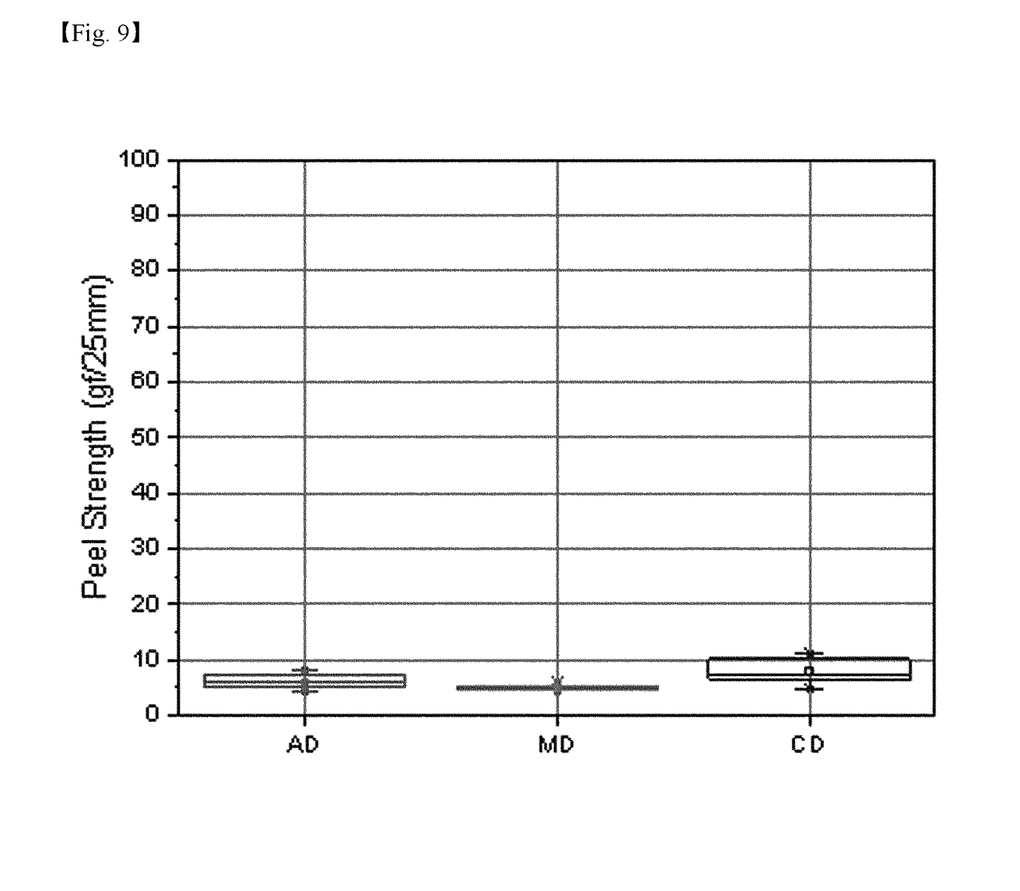
FIG. 9 is a graph showing the results of measuring the adhesive force for a battery according to an embodiment of the present invention.

As shown in FIG. 9, in the case of the battery of Example 1, the variation in the interfacial adhesion force of the three points is 5 gf/25 mm or less, which is almost the same value, indicating that the nonuniformity of the electrode stack surface is improved.

Although the above has been described with reference to a preferred embodiment of the present invention, it can be understood that those skilled in the art can make various modifications and changes to the present invention without departing from the spirit and scope of the invention as set forth in the claims below.

DESCRIPTION OF SYMBOLS

100: electrode stack
110, 120, 130, 140, 150: basic unit electrode assembly
210, 220: pressurizing means

The invention claimed is:

1. A method of manufacturing a lithium secondary battery, the method comprising:
   (a) a step of manufacturing a lithium secondary battery by embedding an electrode stack together with an electrolyte in a battery case;
   (b) a step of aging the lithium secondary battery at room temperature;
   (c) a hot press step of applying pressure and heat to the lithium secondary battery using a hot plate or a roller; and
   (d) a step of charging the battery, the step of charging including an initial charging of the lithium secondary battery,
   wherein the electrode stack has one structure selected from the group consisting of a stack type, a stack-folding type, and a lamination-stack type,
   wherein a stack surface of the electrode stack is laminated by the hot press step, and
   wherein steps (a)-(d) are sequentially performed.

2. The method of claim 1, wherein the hot press step includes applying pressure at a pressure of 3 kgf/cm2 to 10 kgf/cm2 at 60° C. to 90° ° C. for 3 to 15 minutes.

3. The method of claim 1, wherein the hot press step includes applying pressure at a pressure of 3 kgf/cm2 to 7 kgf/cm2 at 65° C. to 75° ° C. for 3 to 7 minutes.

4. The method of claim 1, wherein a thickness variation of the lithium secondary battery is 3 μm or less.

5. The method of claim 1, wherein an adhesion force variation of the stack surface of the electrode stack is 5 gf/25 mm or less.

6. The method of claim 1, wherein the electrode stack is a lamination-stack type.

7. The method of claim 6, wherein the electrode stack includes a plurality of basic unit electrode assemblies, and
   wherein the stack surface is an interface between adjacent basic unit electrode assemblies.

8. The method of claim 1, wherein the step of aging the lithium secondary battery is performed at 20° C. to 30° C. for 12 to 80 hours.

9. A lithium secondary battery manufactured by the method of claim 1.

10. The lithium secondary battery of claim 9, wherein a thickness variation is 3 μm or less.

11. The lithium secondary battery of claim 9, wherein an adhesion force variation of the stack surface of the electrode stack is 5 gf/25 mm or less.

12. A battery pack comprising at least one lithium secondary battery of claim 9.

13. A device using the battery pack of claim 12 as a power source.

* * * * *